(12) United States Patent
Raine

(10) Patent No.: US 12,460,771 B2
(45) Date of Patent: Nov. 4, 2025

(54) ELECTRIC ENERGY STORAGE IN THE FORM OF UNDERGROUND GRAVITY AND BUOYANT ENERGY

(71) Applicant: ENERGY FUTURE INC

(72) Inventor: Brian Raine, Houston, TX (US)

(73) Assignee: ENERGY FUTURE INC, NY (US)

( * ) Notice: Subject to any disclaimer, the term of this patent is extended or adjusted under 35 U.S.C. 154(b) by 222 days.

(21) Appl. No.: 18/198,855

(22) Filed: May 18, 2023

(65) Prior Publication Data
US 2024/0167627 A1 May 23, 2024

Related U.S. Application Data

(60) Provisional application No. 63/344,638, filed on May 23, 2022.

(51) Int. Cl.
*F17C 3/00* (2006.01)
*F03B 13/06* (2006.01)

(52) U.S. Cl.
CPC .............. *F17C 3/005* (2013.01); *F03B 13/06* (2013.01); *F17C 2201/032* (2013.01); *F17C 2203/0604* (2013.01); *F17C 2203/0678* (2013.01)

(58) Field of Classification Search
CPC .................................. F17C 3/005; F03B 13/06
See application file for complete search history.

(56) References Cited

U.S. PATENT DOCUMENTS

| 8,024,927 | B1 * | 9/2011 | Azizi | F03B 17/02 290/1 R |
| 11,739,726 | B2 * | 8/2023 | Gardus | F03B 13/06 290/54 |
| 2021/0372362 | A1 * | 12/2021 | Al-Jandal | F03B 13/10 |

FOREIGN PATENT DOCUMENTS

| AU | 2014308692 A1 * | 3/2016 | E02B 9/00 |
| AU | 2020388505 A1 * | 2/2022 | F03B 13/06 |
| AU | 2022255476 A1 * | 10/2023 | F03B 11/002 |
| CN | 112211773 A * | 1/2021 | F03B 11/002 |
| CN | 115163388 B * | 8/2024 | E02B 3/00 |

* cited by examiner

*Primary Examiner* — Frederick L Lagman
(74) *Attorney, Agent, or Firm* — Gearhart Law LLC

(57) ABSTRACT

Underground facilities built for storing electric energy in the form of gravity and buoyant energy are described herein. In one embodiment, the facility is disposed in a thixotropic fluid beneath the ground surface and houses water to maintain a positive buoyancy and a piston having a bulk density greater than the water. In another embodiment, the underground facility is configured as a buoyant capsule arranged in a cylinder filled with water, where the cylinder is sealed except for openings in a bottom half of the cylinder to allow near unimpeded water flow from a location inside to a location outside of the cylinder. In another embodiment, the underground facility is configured as a negatively buoyant capsule.

44 Claims, 16 Drawing Sheets

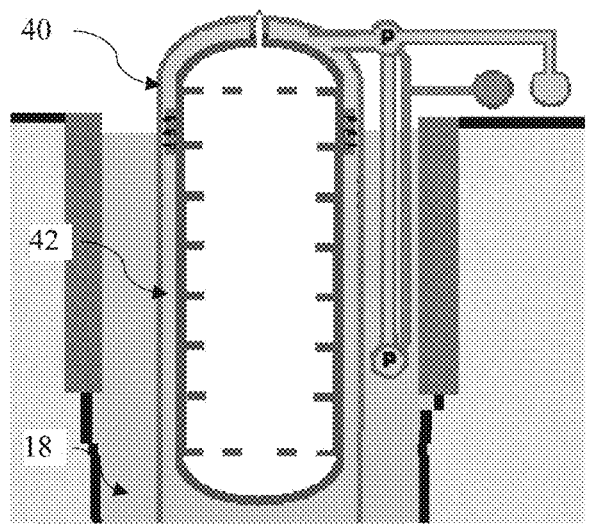
FIG. 7A
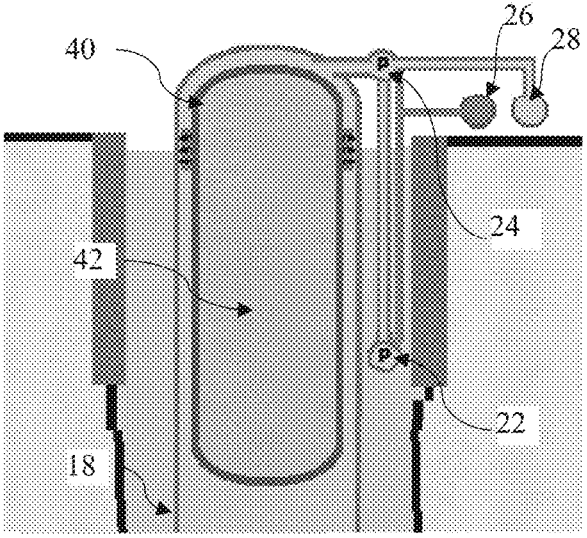
FIG. 7B
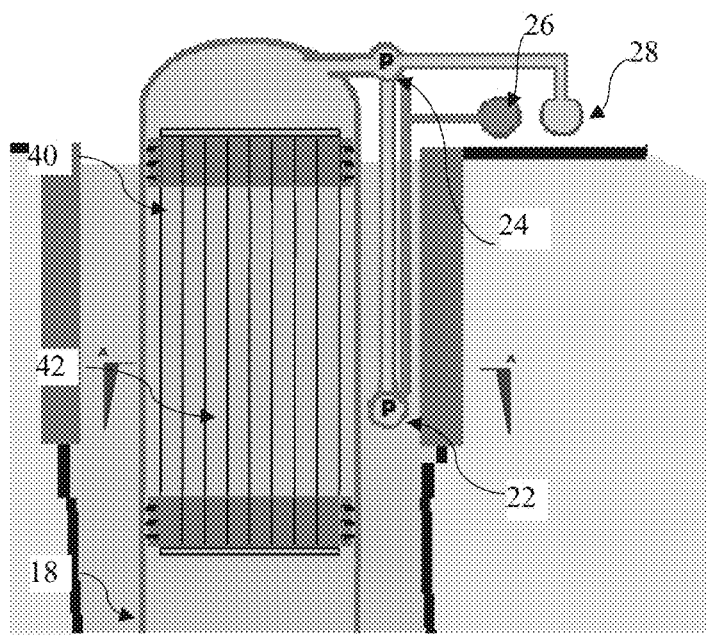
FIG. 7C
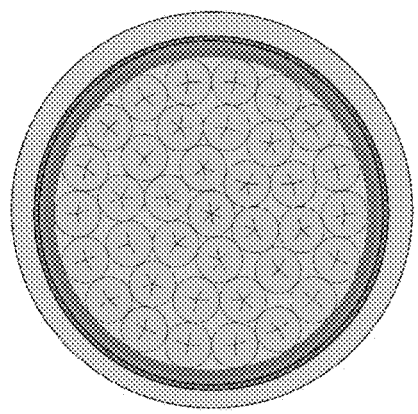

ELECTRIC ENERGY STORAGE IN THE FORM OF UNDERGROUND GRAVITY AND BUOYANT ENERGY

CLAIM OF PRIORITY

This application claims priority to U.S. Application Ser. No. 63/344,638 filed on May 23, 2022, the contents of which are herein fully incorporated by reference in its entirety.

FIELD OF THE EMBODIMENTS

This disclosure relates generally to underground facilities built for storing electric energy in the form of gravity and buoyant energy.

BACKGROUND OF THE EMBODIMENTS

The electric power generation industrial sector is increasing reliance on energy generation from renewable sources such as wind and solar energy. The electric power generation from such sources is intermittent and thus benefits from the addition of electrical power storage for short, medium and long terms.

Short term storage can be provided by chemical batteries, the more common being lithium-ion batteries, flywheels, and intermittent fossil power generators. But chemical batteries dissipate energy over time leading to energy loss. Long term storage can be provided by hydro-storage. Hydro-storage can hold large quantities of energy for a long time, but it is geographically constrained.

Electric energy storage in the form of gravity energy has also been proposed. Lifting and lowering a mass by pumping water from bottom to top or vice-versa of a closed container using electrical energy drawn from a power grid or other source is a known solution. The storage relies on a mass being lifted to a height, held at a higher elevation and lowered at the desired time. The energy stored by raising the mass and then released by lowering the mass is a product of the mass, the height lifted and the gravitational acceleration constant. Electric energy storage in the form of gravity energy can supply electric energy back with a response time in the order of minutes or hours, for example, it can be cycled multiple times a day or at far less frequency depending on the energy generation cycle by the renewable sources of the power source and/or the consumer demand. Electric energy storage in the form of gravity energy can provide long storage time without energy dissipation.

There is a continuing need in the art for large scale facilities adapted for storing electric energy in the form of gravity or buoyant energy that can easily and cheaply be constructed at various sites without relying on the site preexisting configuration, such as the presence of a mine shaft or the presence of a topography suitable for forming a water reservoir.

Location of energy storage in underground facilities may have a sufficiently long life and/or may not age prematurely. Preferably, the underground facilities are designed for providing medium to large scale energy storage, in the order of tens to thousands of megawatt-hours "MW-hr."

Alternately, bodies of sheltered and very deep water may present a good location for floating facilities where the facility is constructed of durable materials. Preferably, the floating facilities may be configured at very large scale as the constructed elements of the facility may be more easily transported to the site from remote marine fabrication facilities, again in the order of tens to thousands of MW-hr. storage capacity.

SUMMARY OF THE EMBODIMENTS

A modular cylindrical structure adapted for storing electric energy in the form of gravity or buoyant energy comprises an outer cylindrical wall, which may be made of steel or reinforced concrete or a composite of steel and concrete. The cylindrical structure is orientated with its longitudinal axis vertical is closed ended at the bottom and includes pipes that connect the lower and upper ends of the facility, or alternately piped between the upper and lower ends of the piston, and is supported in a buoyant, semi buoyant or fixed system. The cylindrical structure encloses a single or segmented mass that can be moved up and down the vertical longitudinal axis to lift or lower the mass, as has been proposed by others. The electric motors can return electrical energy to the power grid or other loads when the piston is lowered, for example through a process known as regenerative loading. The piston preferably comprises a steel or concrete container filled with soil, rock, a solid material with a relatively high specific-gravity or in the case of buoyant energy, a relatively low specific-gravity such as air-filled container immersed in a fluid.

The facility may be constructed at any onshore site with reasonable ground conditions or an offshore site in deep sheltered waters at a location with connection to a power grid. For example, the facility may be constructed as part of an electric power source, such as in proximity of a farm of wind turbines or solar panels, which may only generate electric energy intermittently. The electric power source combining intermittent generation electric energy with storage of electric energy in the form of gravity energy may allow for more uniform supply of electric energy to the power grid and/or a higher peak supply of electric energy to the power grid at times of higher demand. The piston is configured to be a solid mass with bulk density much higher than the surrounding fluid.

Alternately, the piston may be much lower specific-gravity than the surrounding fluid. The stored energy in that alternate case may by resistance to buoyancy uplift rather than resistance to downward gravity force. Utilizing a very low-density piston reduces material demand so reduces cost which will reduce the levelized cost of stored energy. A low-density piston can be achieved by use of high-strength materials to form a hollow capsule or multiple capsules (a "capsule" is a three-dimensional shape consisting of a cylinder with flat or hemispherical ends) that has high capacity to resist pressures normal to its surface. Or, the capsule, or capsules, may be of solid form of a low-density material that can resist hydrostatic pressures normal to its surface with very small deformation. Selection of gravity or buoyant forms of construction may be based on availability or cost of materials at the site or the geological conditions.

BRIEF DESCRIPTION OF THE DRAWINGS

For a more detailed description of the embodiments of the disclosure, reference will now be made to the accompanying drawings, wherein:

FIG. 7A, FIG. 7B, and FIG. 7C depict sectional, partially cut views of a negatively buoyant capsule, according to at least some embodiments disclosed herein.

DESCRIPTION OF THE PREFERRED EMBODIMENTS

Figure 1:
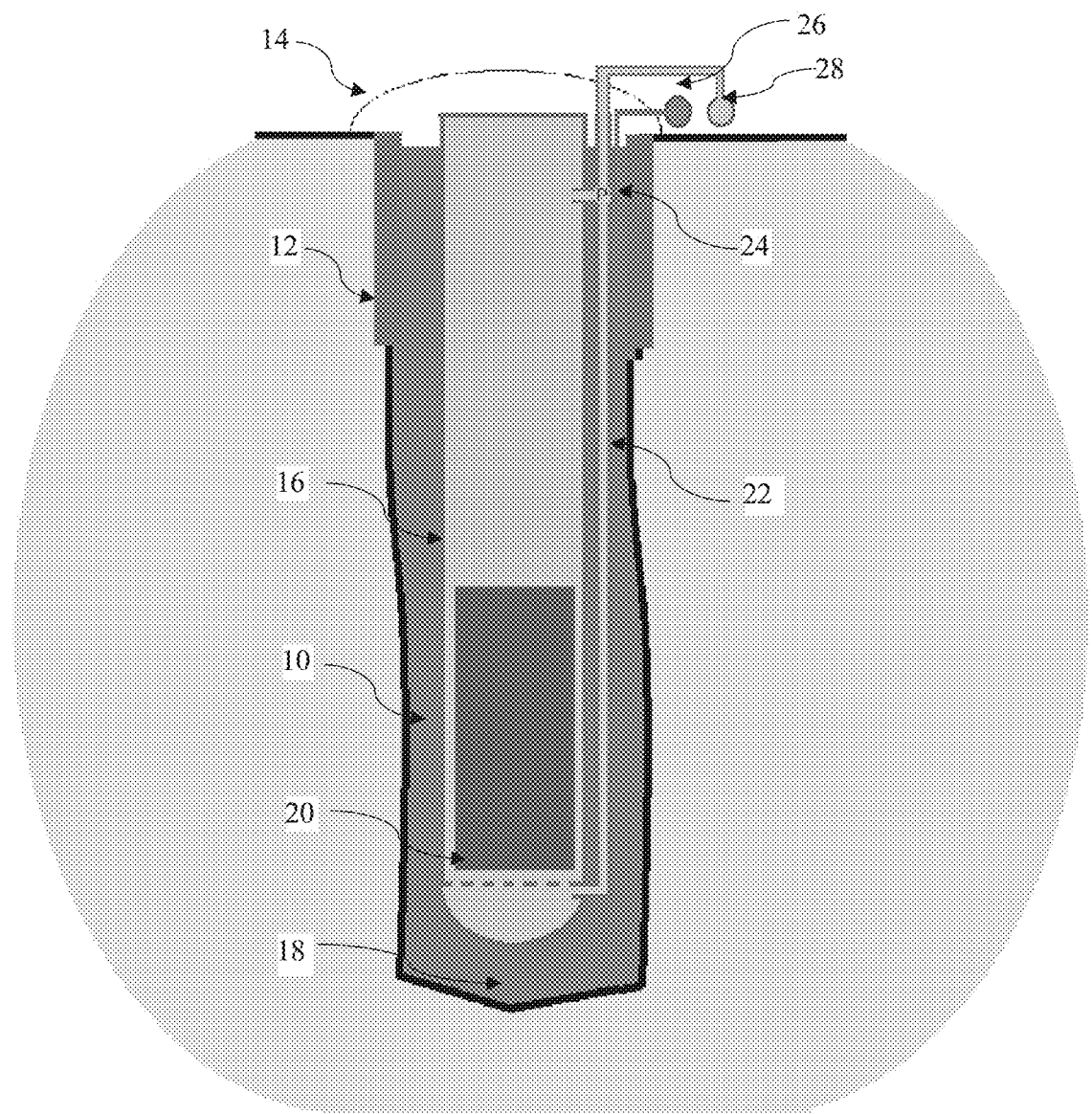
FIG. 1 is a sectional view, partially cut view of a first embodiment of an underground facility adapted for storing electric energy in the form of gravity energy, according to at least some embodiments disclosed herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Also, the exemplary embodiments presented below may be combined in any combination of ways, i.e., any element from one exemplary embodiment may be used in any other exemplary embodiment, without departing from the scope of the disclosure.

FIG. 1 illustrates an underground facility adapted for storing electric energy in the form of gravity energy. The underground facility includes a deep excavation filled with a thixotropic fluid 10 that is preferably cylindrical and may include a steel or reinforced concrete or composite steel-concrete liner 12 in part depending on ground and ground water conditions. The thixotropic fluid would have its density adjusted to suit the ground conditions adjacent to the excavation and the buoyancy to support the gravity power storage cylinder and associated pipes without the need for structural support at its base. The underground excavation 12 may be constructed up to 5,000 meters deep and 50 meters in diameter to suit the desired power storage capacity. A roof 14 of the underground facility 16, rests on and is supported by the surrounding soil.

A steel or reinforced or composite steel and concrete cylinder 16 would be fabricated at the top of the filled excavation and progressively lowered in to the thixotropic liquid. The construction technique will progressively fill the cylinder with water 18 to maintain near neutral but positive buoyancy. A piston 20 will be constructed in a similar manner at ground level and progressively lowered in to the water filled piston. The piston will be constructed from concrete and sand or other material with bulk density greater than water. The highest bulk density could be obtained by incorporating relatively high-density material such as depleted uranium hexafluoride, a waste material available in relatively large quantity in the USA and some other countries. The higher density material provides an opportunity to reduce the dimensions of the overall facility, hence reducing overall cost.

The outer wall of the facility 16 would support a symmetrical arrangement of pipes 22 that connect the underside water chamber with the pumping facility 28. The pipework would include submerged valves 24 and semisubmersible pumps 24 to raise water from the lower chamber to the upper. Reverse flow under the action of gravity would force the return of the raised water to the lower chamber and power the regenerative pump. Power cables 26 would power the pump and water lines and thixotropic lines 28 would supply top up fluids to the system in the event of losses to the ground or evaporation.

Figure 2:
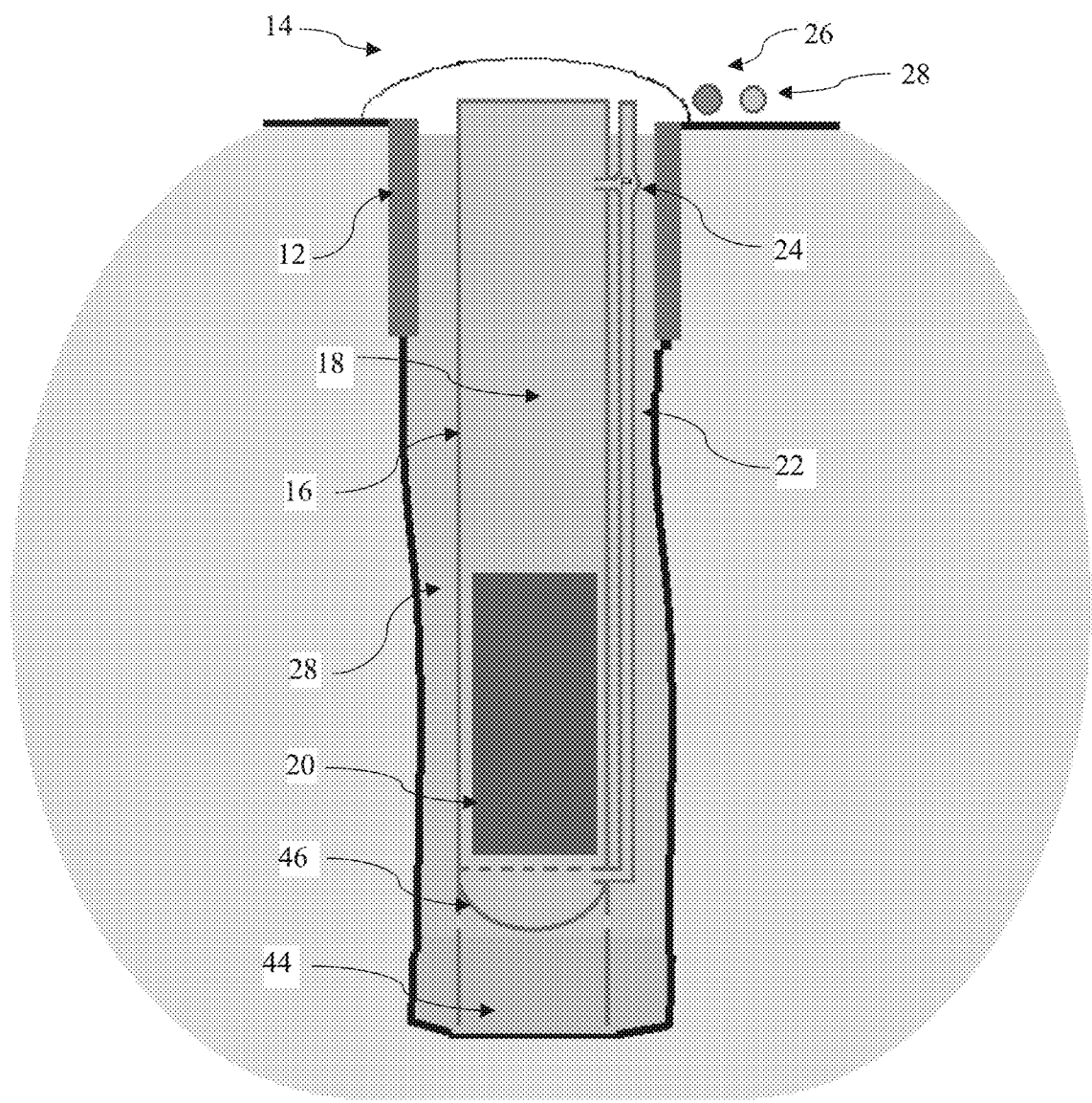
FIG. 2 is a sectional, partially cut view of a first embodiment of an underground facility adapted for storing electric energy in the form of gravity energy with the cylinder supported on an in situ concrete alternate foundation, according to at least some embodiments disclosed herein.

FIG. 2 shows an alternate arrangement in which the cylinder filled with water 18 is rigidly supported in an in situ concrete plug 44. The piston 20 when at rest at the lowest position rests on structural supports 46. The structurally supported arrangement provides for structural support without reliance on equilibrium buoyancy from the thixotropic liquid should that be beneficial considering the selected storage facility scale and site ground conditions.

Figure 3:
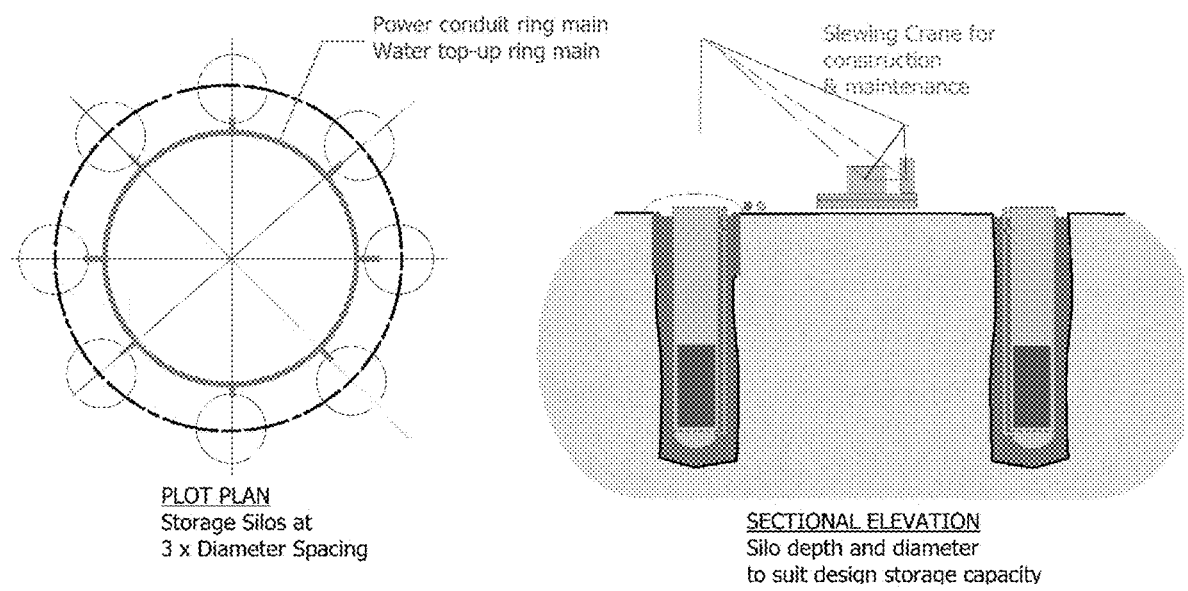
FIG. 3 is a plan and sectional view of a modular facility with eight (8) underground storage facilities in one site for storing electric energy in the form of gravity energy, according to at least some embodiments disclosed herein.

FIG. 3 shows how multiple facilities could be constructed on one site, limited only by the available land area and suitable ground conditions for excavation and ground support. Moreover, the arrangement of underground facilities in a circular pattern provides for the sharing of construction, operations and maintenance equipment helping to ensure lower unit storage costs. The spacing of underground facilities is at three times the excavated diameter, a conventional approach for foundation configurations but may be as low as two times excavated diameter if ground conditions allow closer spacing.

Figure 4:
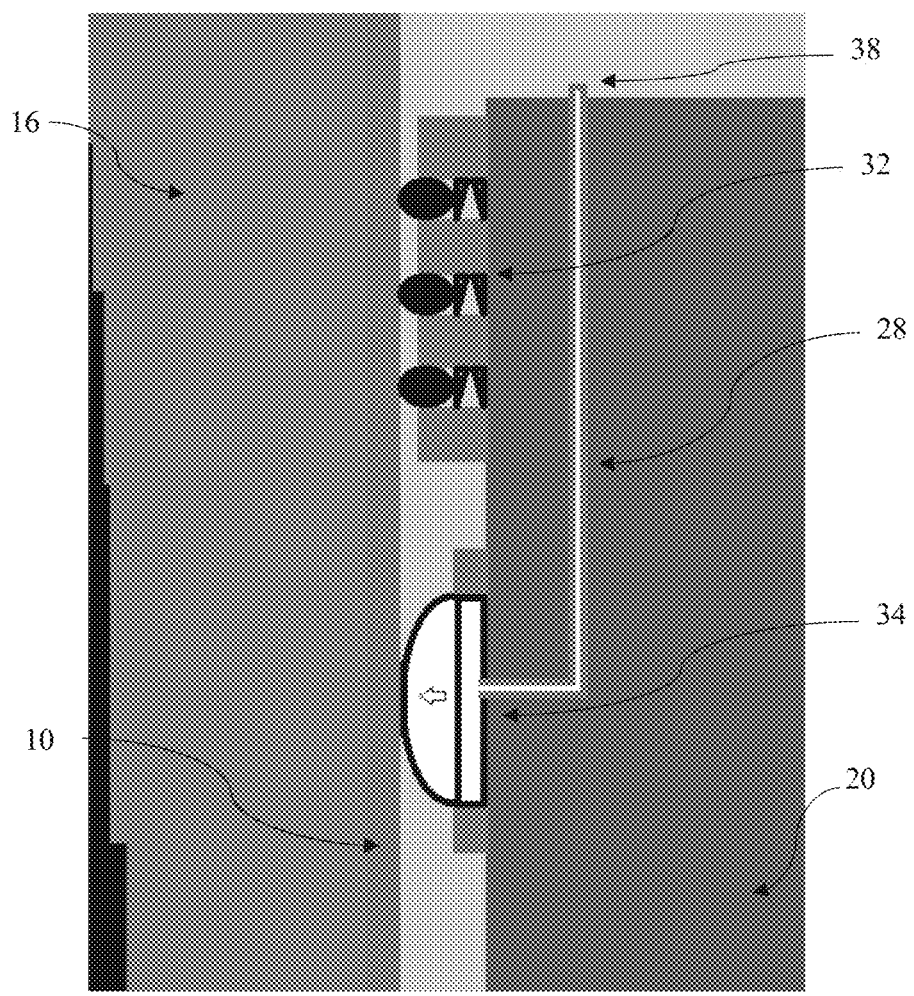
FIG. 4 is a detailed sectional view, of the submerged floating piston seals adapted for storing electric energy in the form of gravity energy, according to at least some embodiments disclosed herein.

FIG. 4 shows flexible seals 32 that will be provided between the piston and cylinder walls at the top of the piston. At least one row but perhaps as many as three rows of seals shall be provided for redundancy. The seals will be secured in the piston by inserts with capacity to resist the upward for from the water pressure on the seal and the frictional forces developed as a result of the outward pressure on the seals pushing against the cylinder. The seals will be configured to be durable for the design life but will include provision for replacement when the piston is raised clear of the water. A number of seal types are considered feasible, such as an O-ring, a saddle type or a more flexible flap type, of which examples can be found in industry.

The cylinder may be lined internally with a coating from with polyurethane, fusion-bonded or thin-film epoxy or powder coating for enhanced liner corrosion protection and a low coefficient of sliding friction to reduced resistance to cylinder movement and to minimize seal wear. The method of application would be consistent with the application to the internal surface of steel pipelines for fluid transport, for example.

FIG. 4 also shows an expandable bladder 34 positioned below the seals. The bladder expands under the action of water pressure supplied by a small diameter pipe 28 and connection to the top of the piston 38 and a temporary pump 36 that would apply water pressure to the bladders to inflate to a pressure equal to that needed to support the partially submerged piston. Under the action of the water pressure the expanded bladder 34 will fill the space between piston and cylinder to effect a seal, not unlike expandable seals used commonly used in household plumbing maintenance tasks. With that seal in place the piston may be raised to above the top of cylinder to allow for occasional piston seal maintenance or replacement. The capacity to raise the piston seals above the water elevation will be by pumping water 22 in to the void below the piston 20.

Figure 5:
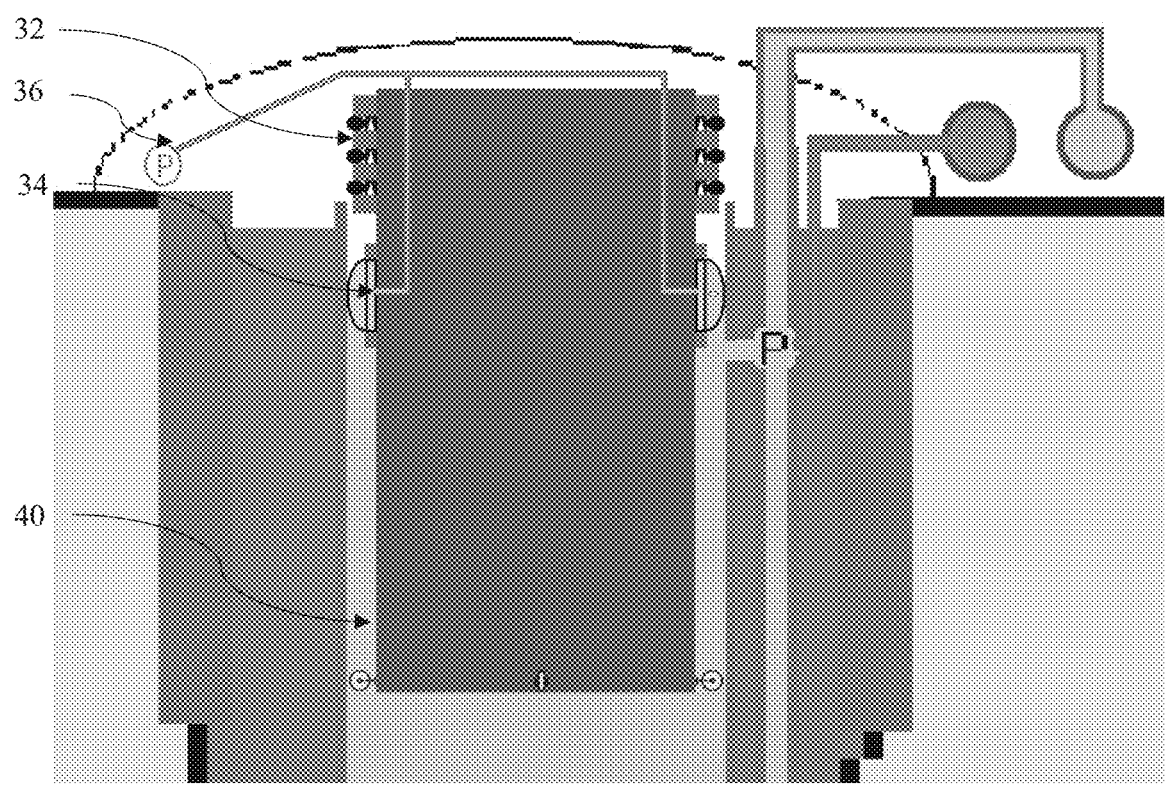
FIG. 5 is a detailed view of the piston in an elevated position to effect periodic seal maintenance, according to at least some embodiments disclosed herein.

FIG. 5 shows the piston raised a short distance above the surrounding cylinder, sufficient to expose the seals 32 at the top of piston 20 above the top of cylinder. The seals may then be maintained or replaced as needed. The extreme raising operation would only be carried out periodically as the cylinder and container would be maintained in a clean condition. The bottom of the piston would include guide rollers and lateral spring 40 at the bottom of the piston. These would not be maintainable so would be fitted with a robust bearing.

During a cycle of electric energy storage and generation, a small amount of energy is dissipated in the friction in the seal between piston and cylinder, friction loss in the pump motors, friction losses in the pipe inlet, over the pipe length and the pipe outlet, and electrical cabling losses. However, with appropriate design of mechanical elements, an energy efficiency of 85% or higher can be achieved to achieve a round trip efficiency of 75% or higher, consistent with that measured in utility-scale hydro-power storage schemes. Those design elements would be the selection of low friction seals and bearings.

Figure 6:
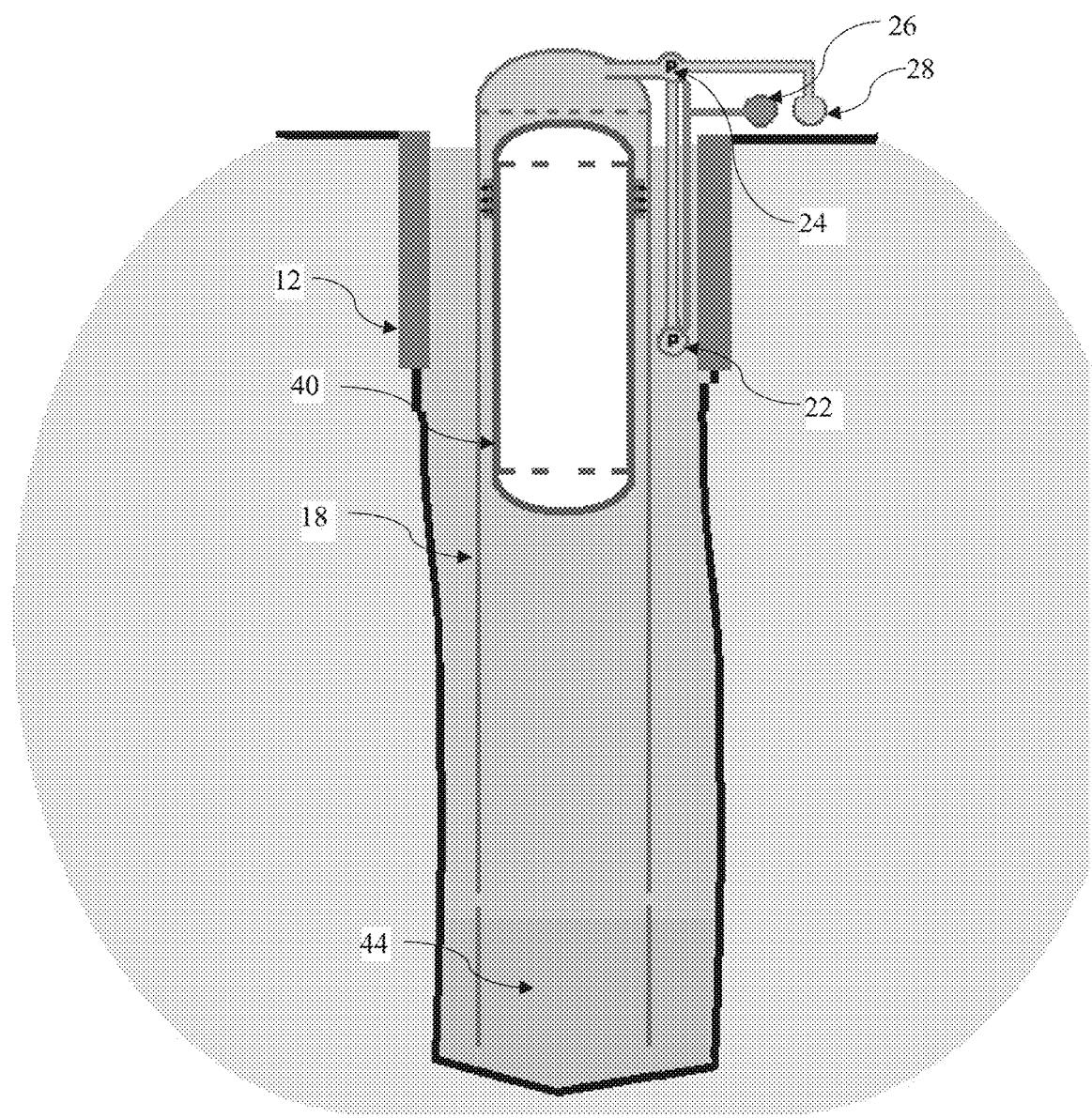
FIG. 6 is a detailed sectional, partially cut view of a first embodiment of an underground facility adapted for storing electric energy in the form of gravity energy using a positively buoyant capsule, according to at least some embodiments disclosed herein.

FIG. 6 shows alternate to the configuration of a very heavy mass is to configure a buoyant capsule solution. A buoyant capsule 40 is arranged inside a cylinder filled with water 18. The cylinder is a sealed tube except for openings in the bottom half of the cylinder to allow near unimpeded water flow from inside to outside the cylinder. The buoyant capsule 40 raises and lowers as water is released or added to the top of the cylinder. Adding water under pressure to the top of the cylinder stores energy, releasing water at the top of the cylinder through a water turbine recovers the stored energy less an amount of energy loss due to friction and mechanical losses.

FIG. 7A, FIG. 7B, and FIG. 7C depict possible configurations of the buoyant capsule. FIG. 7A shows a stainless or carbon steel or aluminum cylindrical capsule 40 with internal stiffening 42 as needed to resist differential pressure on the capsule. A stiffened steel capsule may be configured to be pressurized to at least one-half of the imposed pressure on the capsule. Air pressure may be added and topped up periodically through an air valve 44 when the capsule is positioned at the top of the water-filled cylinder 18.

FIG. 7B shows an alternate arrangement of a poly vinyl chloride (PVC) or High Density Poly Ethylene (HDPE) or other plastic capsule 40 filled with an aerated PVC or HDPE or other aerated plastic such that the capsule bulk density is much less than the density of water or other fluid in the cylinder. The capsule materials would be selected to provide the lowest feasible density while maintaining sufficient strength to resist the applied external hydrostatic forces at the maximum depth of capsule. Such arrangements are provided in HDPE in the form of seawater buoys that have a hard HDPE outer and an aerated HDPE inner fill material.

FIG. 7C shows an alternative arrangement of a cluster of pipes forming a cylindrical capsule 40. An arrangement of 19 or 37 vertical pipes can assure contact of all pipes within a circle to ensure best lateral stability. The pipes would be air and water sealed and may be pressurized to reduce stress on the pipe. The hoop strength of the pipes provides resistance to external hydrostatic water pressures. The seal is positioned at top and bottom of the cylinder with lateral restraint provided by the closure plate.

Figure 8:
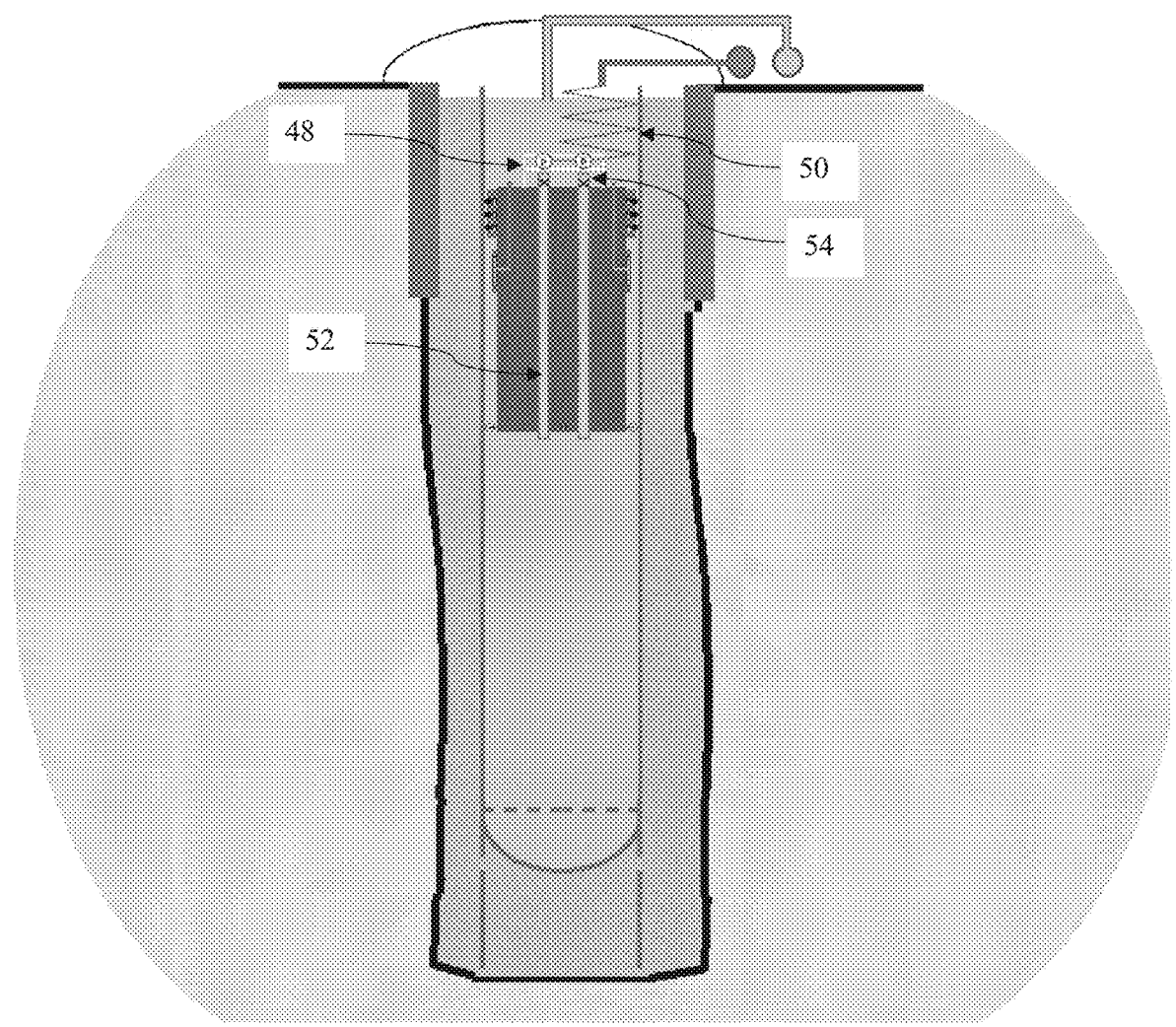
FIG. 8 shows a detailed sectional, partially cut view of a pumping system embedded in to the solid mass piston, according to at least some embodiments disclosed herein.

FIG. 8 shows a sectional view of a pumping system mounted in to the solid mass piston 20. The benefit of this arrangement is a more direct transfer of fluid across the seal, resulting in reduced losses. Four pumps 48 are provided to ensure redundancy and to operate in opposing directions so as to reduce longitudinal axis rotation (known as yaw) of the piston. Alternately, a single pump with yaw compensation could be incorporated. Power cabling 50 is arranged in a concertina form or telescoped or feed to or from a cable roll to allow for the planned piston vertical movement. Pipes 52 are cast in to the piston mass to allow water flow through the piston. Pipe valves 54 are remotely actuated to close off flow when the piston is to be held at a chosen elevation.

Figure 9:
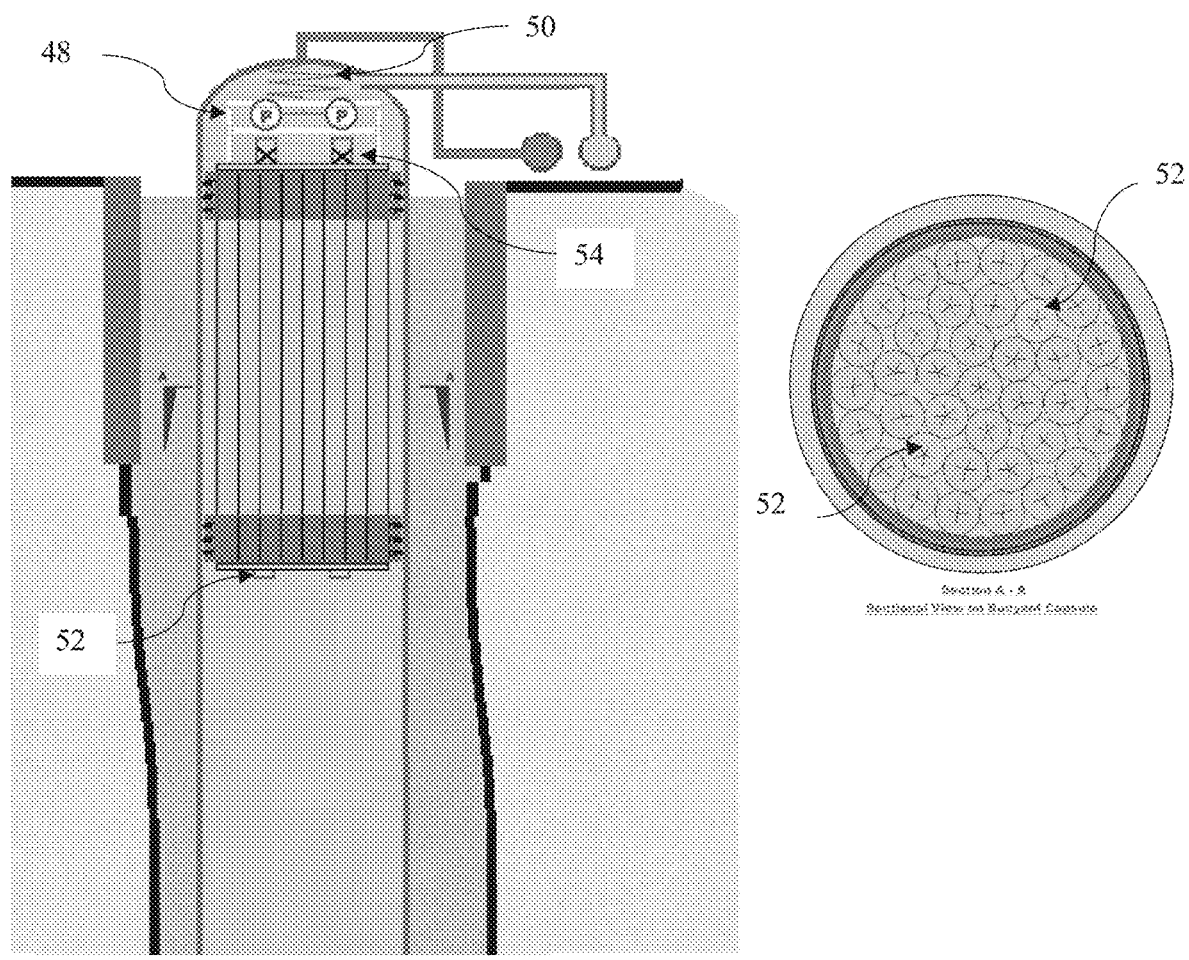
FIG. 9 shows a detailed sectional, partially cut view of a pumping system embedded in and attached to the positively buoyant capsule, according to at least some embodiments disclosed herein.

FIG. 9 shows a negatively buoyant capsule with a pumping system mounted on top of the capsule. As above, four pumps 48 are provided and power cabling is arranged in a concertina form or telescoped to allow for the planned piston vertical movement. Two or four of the vertical pipes 52 are in the capsule allow water flow through the capsule. Pipe valves 54 are remotely actuated to close off flow when the piston is to be held at a chosen elevation. The proposed gravity piston solution may be scaled to suit the desired power storage capacity such be changing the cylindrical outer wall dimension, the piston height dimension and the piston density. For example, having an approximate diameter of 20 meters and an excavation depth of 536 meters would correspond to a power storage capacity of 100 MW-hr. in gravity energy per facility. At the larger scale an underground storage facility having an approximate diameter of 40 meters and an excavation depth of 2,634 meters would correspond to a power storage capacity of 10,000 MW-hr.

The proposed buoyant capsule solution may also be scaled to suit the desired power storage capacity such be changing the cylindrical outer wall dimension, the piston height dimension, the supporting fluid density, and the piston density. For example, having an approximate diameter of 20 meters and an excavation depth of 790 meters would correspond to a power storage capacity of 100 MW-hr. in gravity energy per facility. At the larger scale an underground storage facility having an approximate diameter of 38 meters and an excavation depth of 4,124 meters would correspond to a power storage capacity of 10,000 MW-hr.

Figure 10:
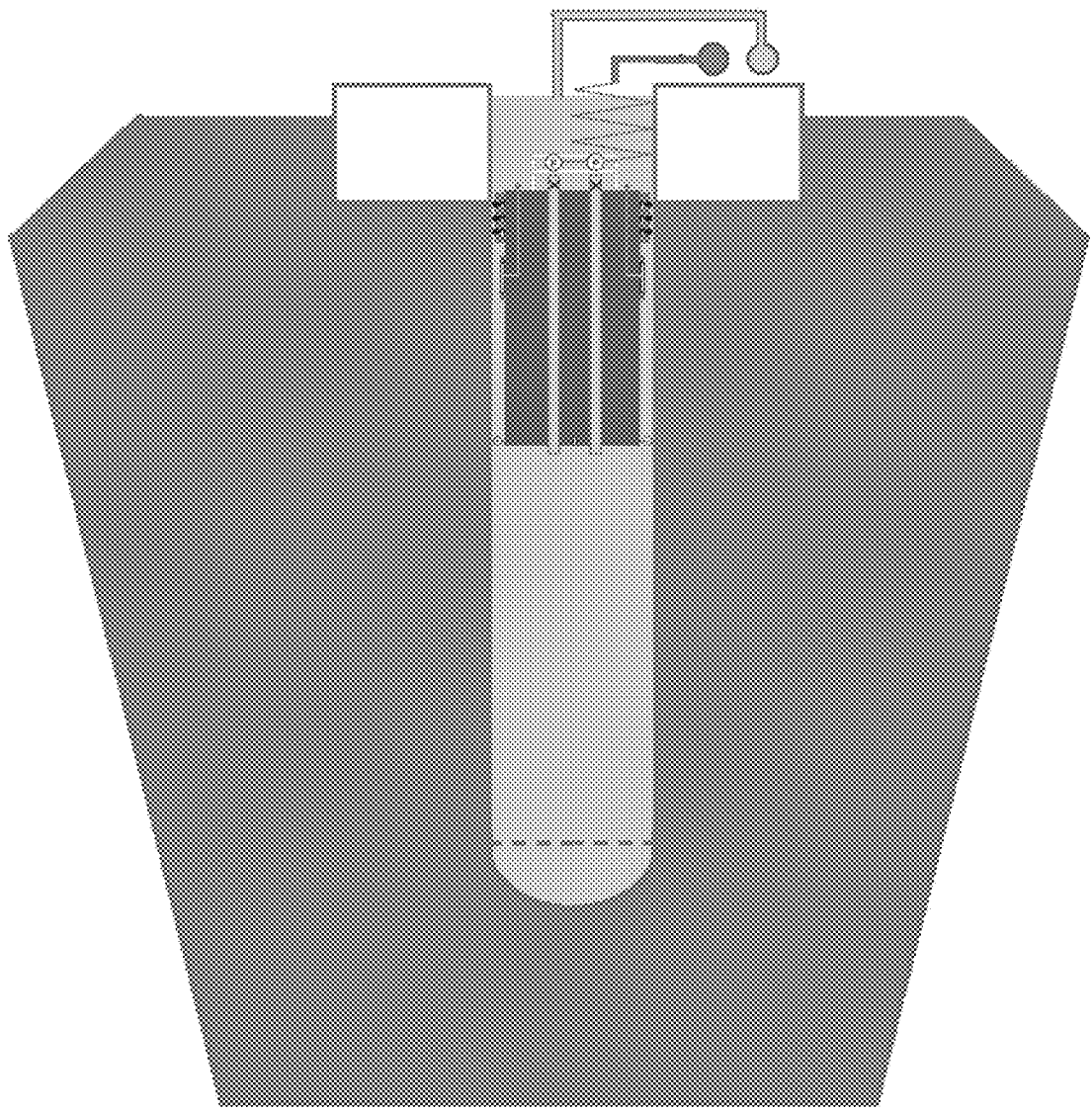
FIG. 10 is a sectional view of a submerged floating facility for storing electric energy in the form of gravity energy incorporating the integral pump and piston arrangement, according to at least some embodiments disclosed herein.

FIG. 10 shows a similar arrangement in which the floating alternate concept could be configured for similar capacity in sheltered waters. It may be installed in seawater or freshwater locations to depth and diameter limited only by the water depth and a practical buoyancy volume.

Figure 11:
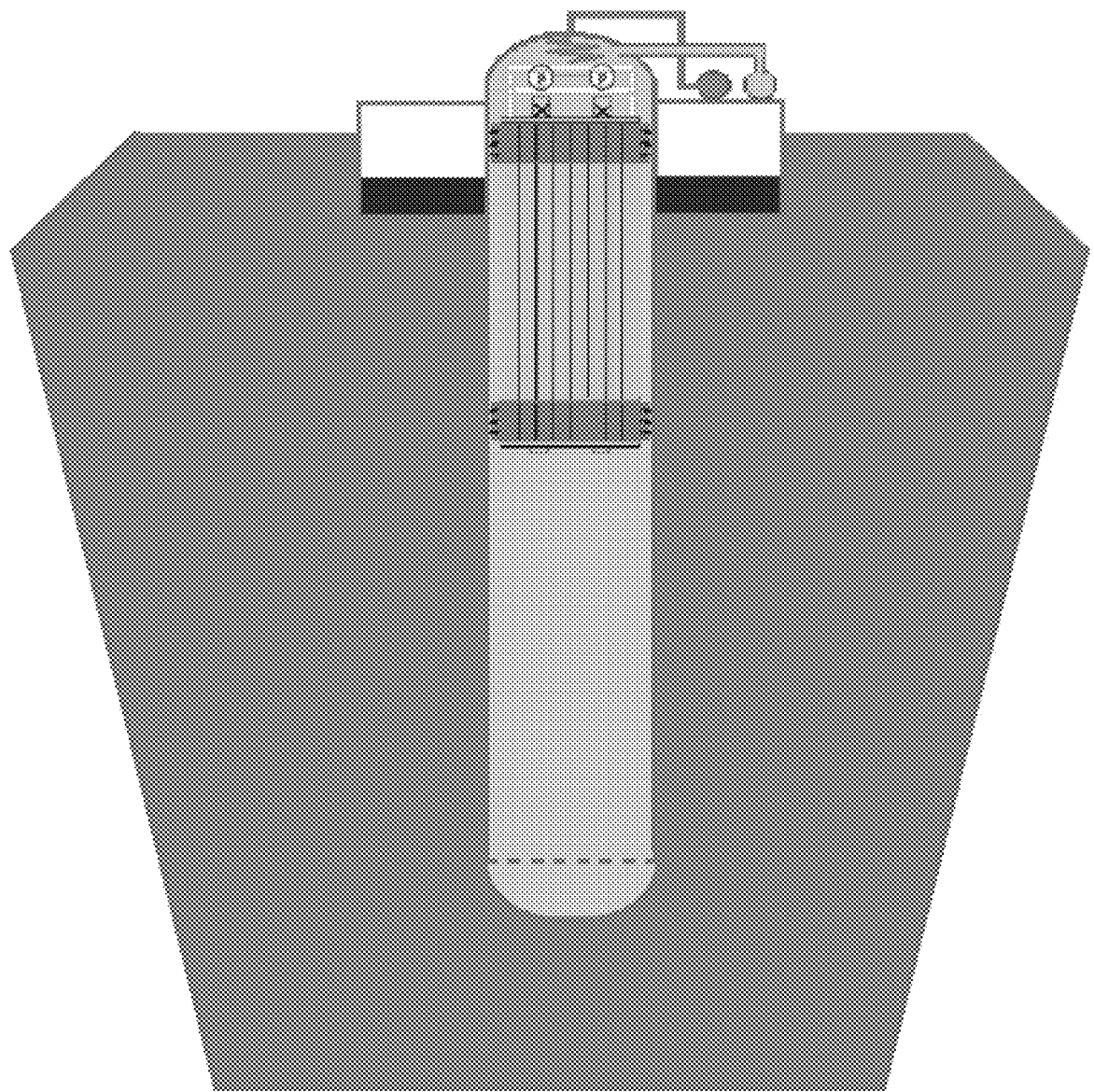
FIG. 11 is a sectional view of a submerged floating facility for storing electric energy in the form of gravity energy using a positively buoyant capsule incorporating an integral pump system, according to at least some embodiments disclosed herein.

FIG. 11 shows a similar arrangement in which the floating positive buoyancy piston second alternate concept could be configured for similar capacity in sheltered waters. It also may be installed in seawater or freshwater locations to depth and diameter limited only by the water depth and a practical surface volume.

Figure 12:
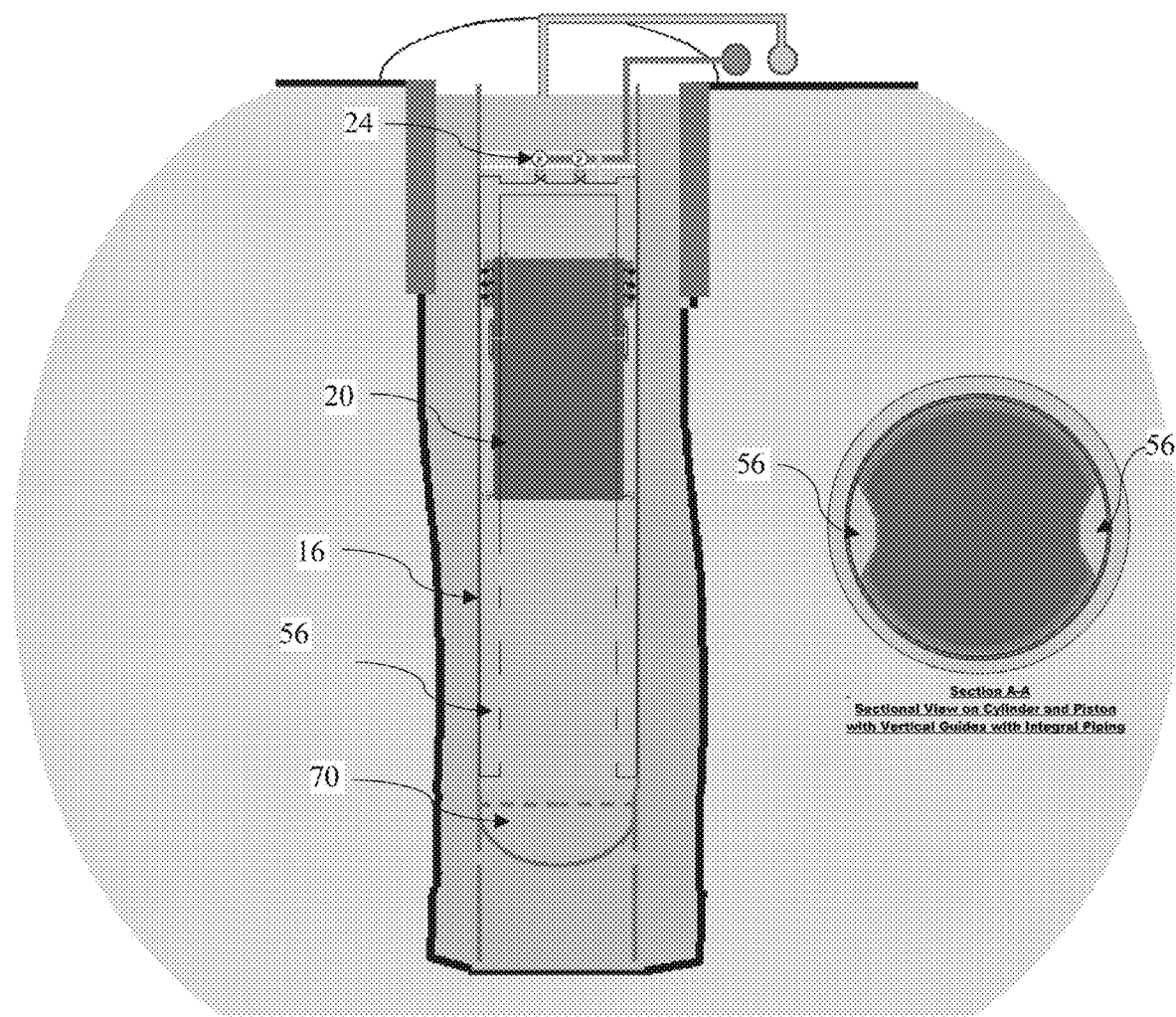
FIG. 12 shows a detailed sectional, partially cut view and a detailed plan view of a piston guide system integrated with the solid mass piston and pump for the purpose of controlling yaw movement of the piston and to facilitate fluid flow from under the piston to the pump, according to at least some embodiments disclosed herein.

FIG. 12 shows a gravity piston or buoyant capsule 20 in the cylinder 16, but with the cylinder having two or more vertical sealed chambers 56 arranged to guide the piston or capsule in its vertical movement. The guide chambers prevent on-plan rotation, otherwise known as yaw of the piston or capsule. The guide chambers are proportioned to allow water flow from the pump/turbine to beneath the piston. The chambers are open at the lower elevation to allow water flow. The guide chambers terminate at an elevation suitable for the support of the pumps 24, with appropriate water elevation above to allow for efficient pumping water from above to below the piston. Additionally, the bottom of the piston is backfilled with coarse gravel 70 that provides a permeable support to the piston if at its lowest elevation.

Figure 13:
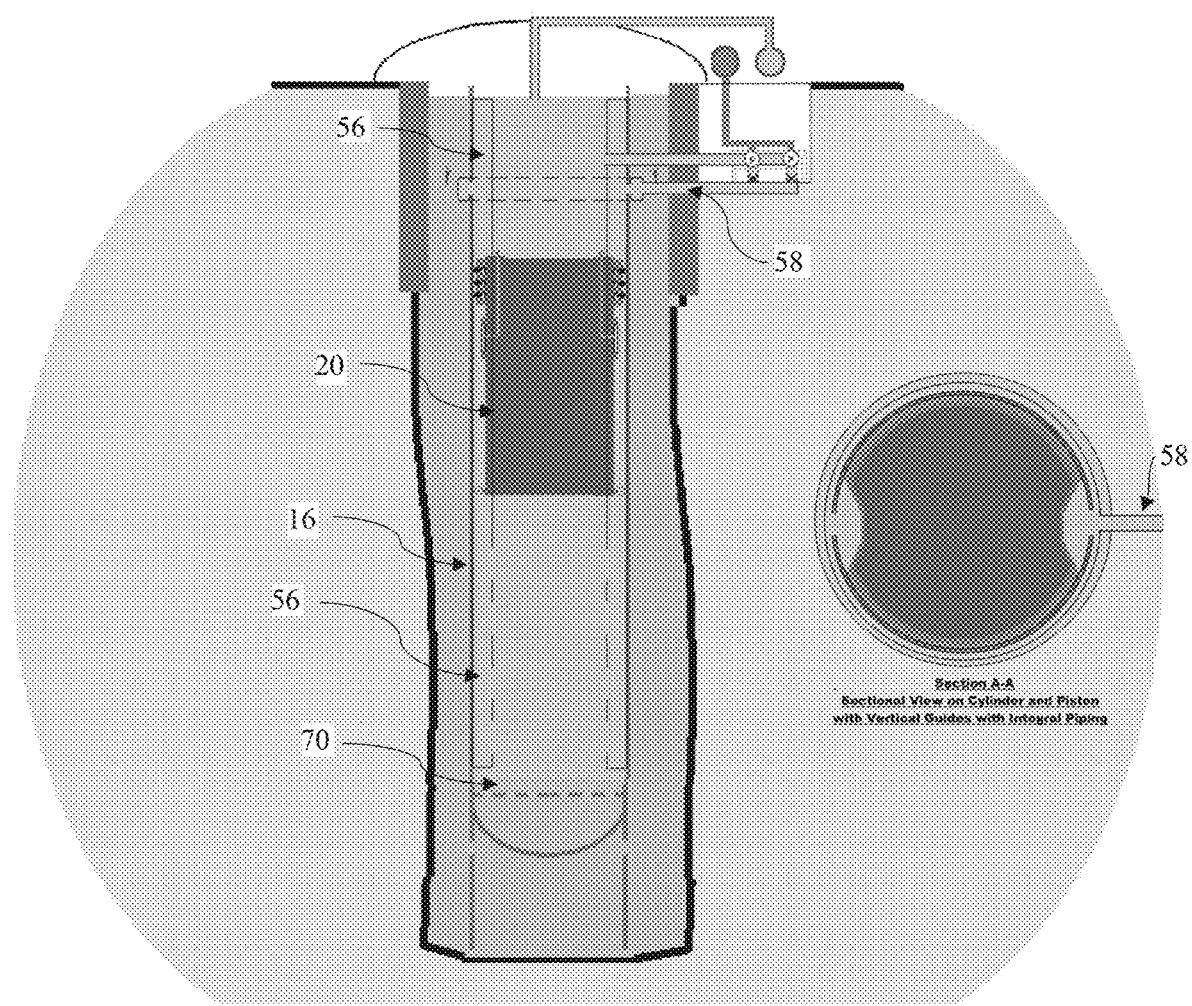
FIG. 13 is a detailed sectional, partially cut view showing the pumping system offset from the piston and cylinder below ground, according to at least some embodiments disclosed herein.

FIG. 13 shows a gravity piston or buoyant capsule in a cylinder fitted with guide chambers as per FIG. 12. The upper water chamber and guide chambers 56 are hydraulically connected to external pipework 58 at below ground elevation outside the silo. The combined pump/turbine buried elevation is suitable for the support of the pumps with appropriate water elevation above to allow for efficient pumping water from above to below the piston.

Figure 14:
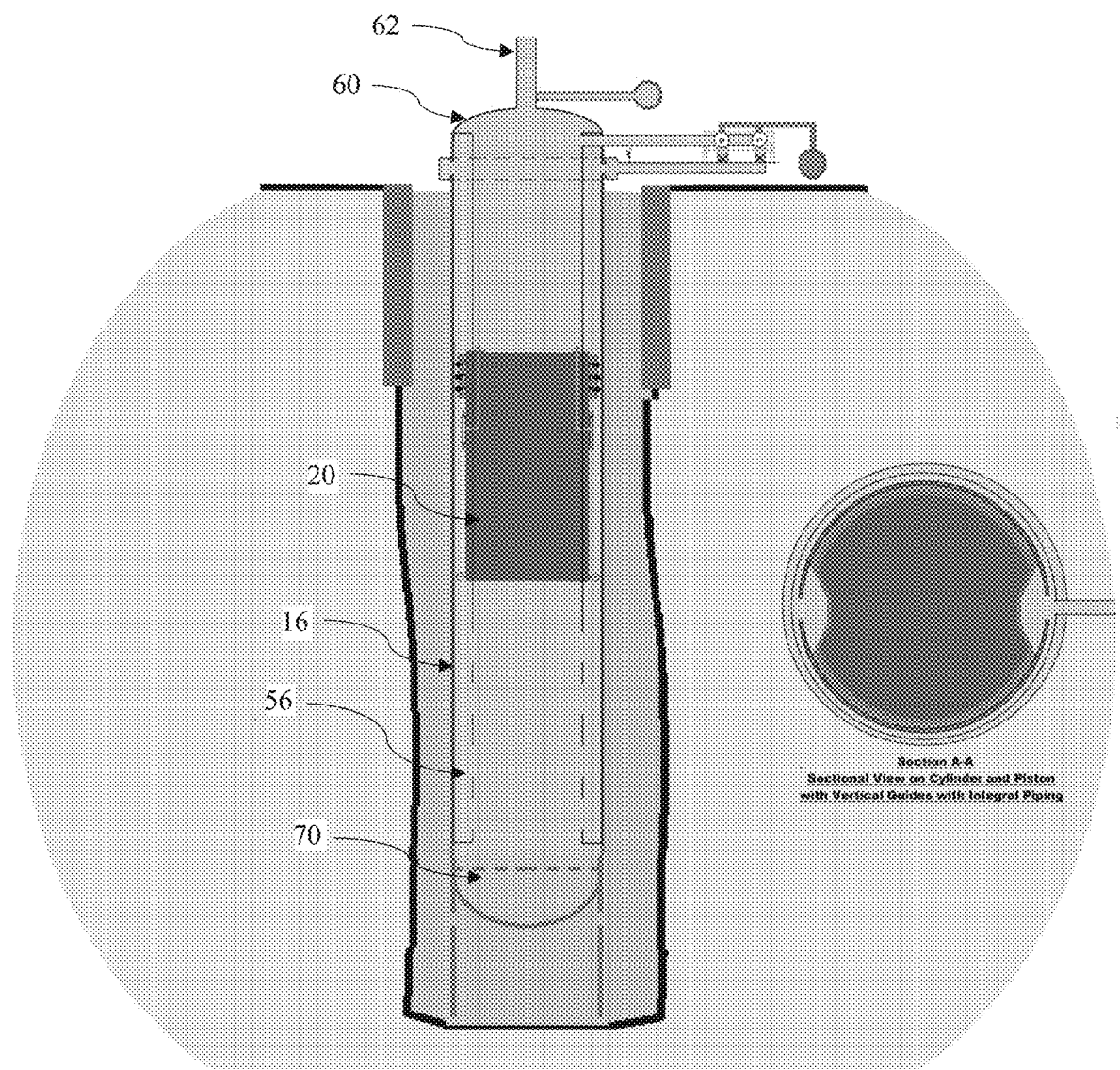
FIG. 14 is a detailed sectional, partially cut view showing the pumping system offset from the piston and cylinder at or above ground, according to at least some embodiments disclosed herein.

FIG. 14 shows the cylinder with guide chambers described in FIG. 12 but with the pumps configured at or above ground level for convenience of operational access. The water level in the cylinder is raised to an elevation suitable for the support of the pumps with appropriate water elevation above to allow for efficient pumping water from above to below the piston. This necessitates a closed top to the cylinder 60 and elevated standpipe 62. The closed top to the cylinder is removeable to allow for the occasional raising of the piston to complete seal maintenance described previously.

Figure 15:
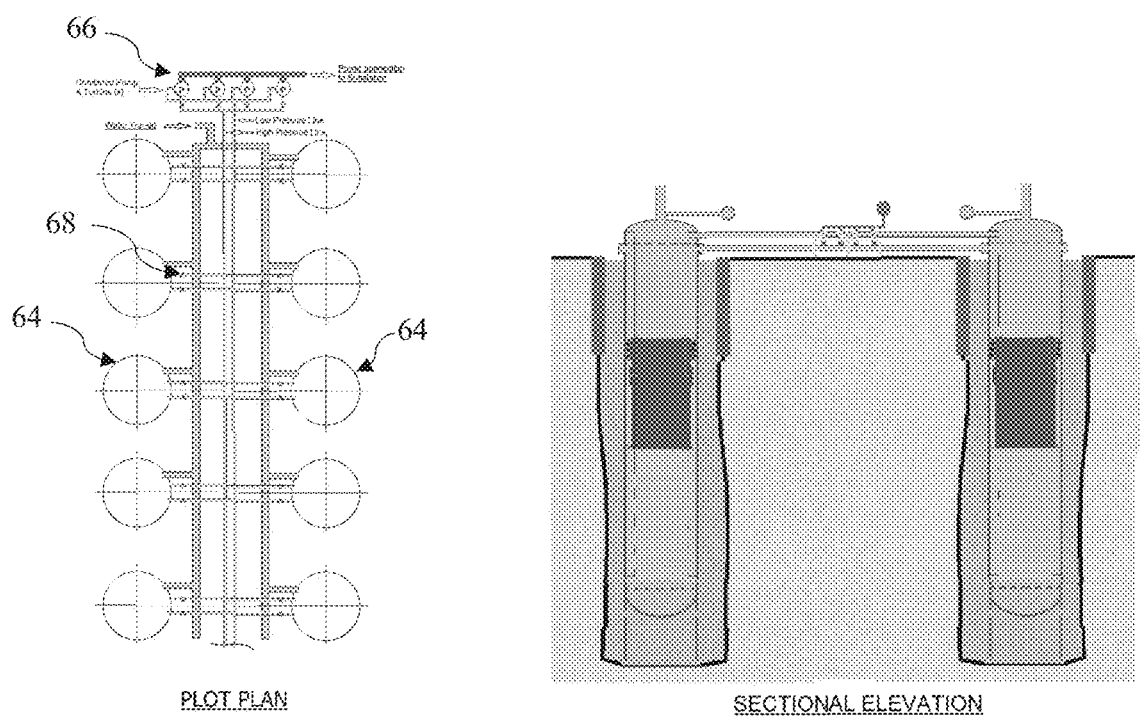
FIG. 15 is a detailed sectional, partially cut view showing the pumping system offset from the piston and cylinder and a header system to link multiple silos to a single pump, or multiple pumps, according to at least some embodiments disclosed herein.

FIG. 15 shows a multiple silo power storage facility in which several silos 64 are grouped adjacent to a common pump and turbine facility 66 for power consumption and generation. By the sharing of common facilities, the overall economics, redundancy and responsiveness of the power storage facility may be improved. The combined pump/turbine facility may be operated a different but stepped flow rates by opening or closing valves 68 to each silo.

Figure 16:
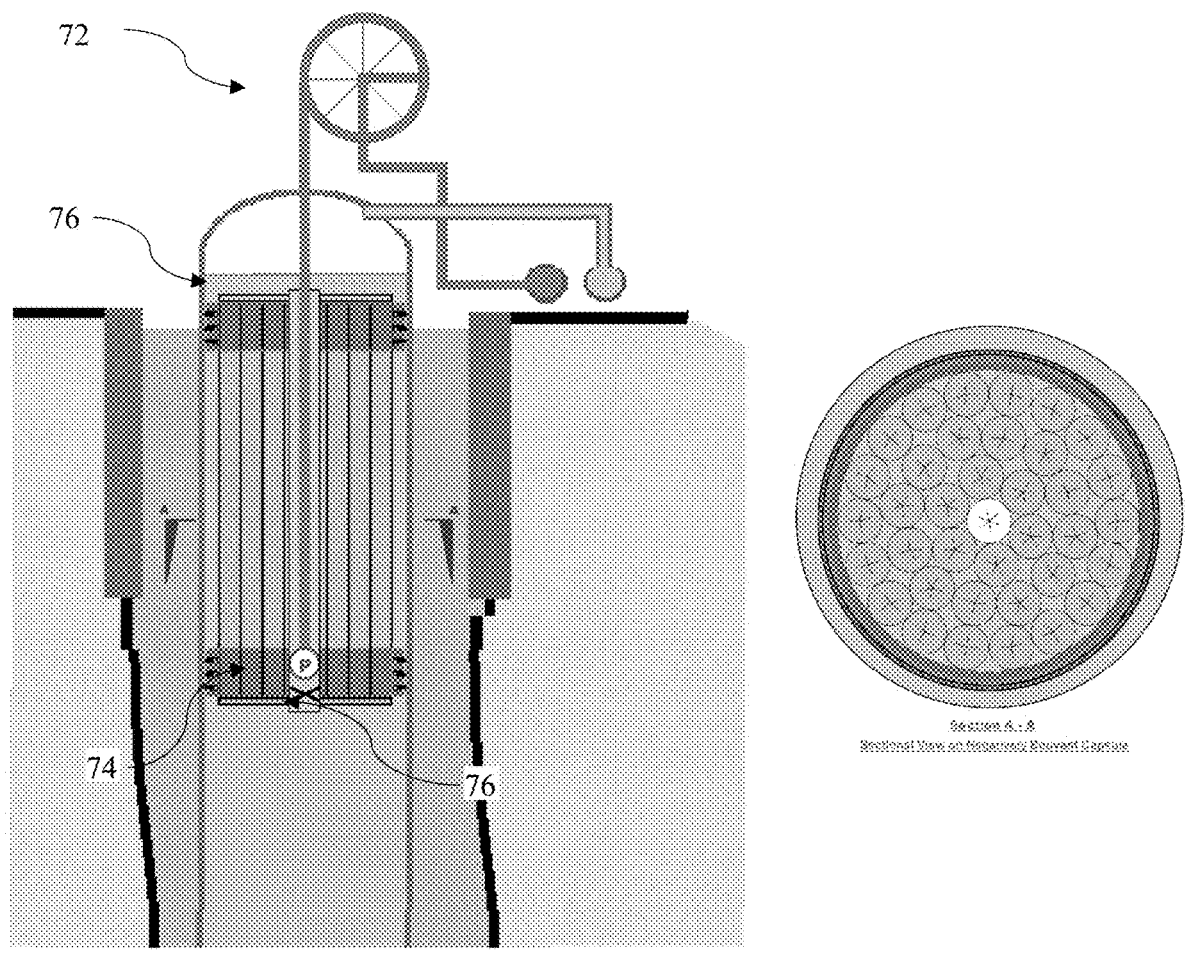
FIG. 16 is a detailed sectional, partially cut view showing the pumping system positioned at the bottom of the solid mass piston and at the bottom of a pipe caisson and having a cable recovery system to accommodate the piston movement, according to at least some embodiments disclosed herein.

FIG. 16 shows a shows a positively buoyant capsule with a pumping system mounted at the bottom of the capsule consisting a cluster of relatively high bulk density pipes with an overall seal top and bottom. One pump 70 is provided and power cabling is arranged in a rolled or telescoped form 72 to allow for the planned piston vertical movement. A vertical pipe, or pipes, 74 is incorporated in to the capsule allow water flow through the capsule. Pipe valves 76 are remotely actuated to close off flow when the piston is to be held at a chosen elevation. With the pump positioned at the lower end of the piston the water level 76 may be reduced to be marginally above the upper level of the piston so maximizing the effective use of the overall facility elevation. A similar arrangement but with a solid piston rather than a cluster of pipes may be configured. A similar arrangement of an inflatable bladder below the top seal, as above, may be incorporated to allow for occasional lifting to access and maintain seals.

The proposed gravity piston solution may be scaled to suit the desired power storage capacity such be changing the cylindrical outer wall dimension, the piston height dimension and the piston density.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system adapted for storing electric energy in a form of gravity energy, the system comprising:
   an excavation disposed beneath a ground surface, the excavation being filled by a fluid;
   a cylindrical facility having a first side disposed opposite a second side, the first side being located above the ground surface and the second side being disposed in the fluid beneath the ground surface, wherein the cylindrical facility houses water to maintain a positive buoyancy and a piston having a bulk density greater than the water;
   an arrangement of pipes that connect the cylindrical facility with a pumping facility disposed above the ground surface;
   a roof disposed above the ground surface and covering the first side of the cylindrical facility;
   power cables disposed above the ground surface; and
   water lines and thixotropic lines disposed above the ground surface and configured to supply fluids to the system.

2. The system of claim 1, wherein the excavation is cylindrical in shape.

3. The system of claim 1, wherein the fluid comprises a thixotropic fluid.

4. The system of claim 1, further comprising a liner surrounding the excavation, wherein the liner comprises a material selected from the group consisting of: steel, reinforced concrete, and composite steel-concrete.

5. The system of claim 1, wherein the excavation is up to about 5,000 meters deep.

6. The system of claim 1, wherein the excavation is up to about 50 meters in diameter.

7. The system of claim 1, wherein the arrangement of pipes comprises valves and pumps disposed beneath the ground surface, and wherein the arrangement of pipes are configured to raise the water from a lower chamber to an upper chamber.

8. The system of claim 1, further comprising:
   a plug disposed beneath the second side of the cylindrical facility.

9. The system of claim 8, further comprising:
   a structural support component disposed between the second side of the cylindrical facility and the plug.

10. The system of claim 9, wherein the piston, when at rest at a lowest position, rests on the structural support component.

11. The system of claim 8, wherein the plug comprises a concrete material.

12. The system of claim 1, wherein a quantity of the cylindrical facility is more than one such that a first cylindrical facility is separated by a distance from a second cylindrical facility.

13. The system of claim 1, further comprising:
   one or more flexible seals provided between the piston and walls of the cylindrical facility at a top of the piston.

14. The system of claim 13, wherein the one or more flexible seals are provided in at least three rows.

15. The system of claim 13, wherein the one or more flexible seals are secured in the piston by inserts.

16. The system of claim 13, further comprising:
   an expandable bladder positioned below the one or more flexible seals.

17. The system of claim 16, wherein the expandable bladder is configured to expand under water pressure supplied by a pipe and connection to a top of the piston and a temporary pump that applies the water pressure to the expandable bladder to inflate to a pressure equal to that needed to support a partially submerged piston.

18. The system of claim 17, wherein, under the action of the water pressure, the expanded bladder is configured to fill a space between the piston and the cylindrical facility to effect a seal.

19. The system of claim 18, wherein, with that seal in place, the piston is raisable to a position above a top of the cylindrical facility to allow for piston seal maintenance or replacement.

20. The system of claim 1, wherein an interior of the cylindrical facility is lined with a coating material.

21. The system of claim 20, wherein the coating material is selected from the group consisting of: polyurethane, a fusion-bonded epoxy or powder coating, and a thin-film epoxy or powder coating.

22. The system of claim 1,
   wherein the arrangement of pipes comprises a subset of vertical pipes located within an internal wall of the cylindrical facility, and
   wherein the subset of vertical pipes provide yaw restraint to the piston.

23. The system of claim 22, further comprising:
   one or more flexible seals provided between the piston and walls of the cylindrical facility at a top of the piston, wherein the one or more flexible seals are continuous and shaped around a non-cylindrical shape that incorporates the subset of vertical pipes.

24. The system of claim 1, wherein the arrangement of pipes are supported at a top location and are sufficiently submerged to operate the pumping facility.

25. The system of claim 1 wherein the piston is comprised a cluster of negatively buoyant pipes in cylindrical or other polygon form or variable pipe diameter for higher packing density, perhaps filled with soil, rock or even depleted uranium hexafluoride for best efficiency.

26. The system of claim 25 in which a single or multiple pipes transfer fluid from above to below the piston with the pump and turbine located at the bottom of the piston.

27. The system of claim 26 in which the power line is fed from a roller above the facility to effect a vertical movement up to 2 of the total facility depth.

28. The system of claim 26 with the fluid level at atmospheric pressure and close to ground level.

29. A system adapted for storing electric energy in a form of gravity energy, the system comprising:
   an excavation disposed beneath a ground surface, the excavation being filled by a fluid;
   a buoyant capsule arranged in a cylinder filled with water, wherein the cylinder is partially sealed with openings in a bottom half of the cylinder to allow near unimpeded water flow from a location inside of the cylinder to a location outside of the cylinder;
   an arrangement of pipes that connect the cylinder with a pumping facility disposed above the ground surface;
   power cables disposed above the ground surface; and
   water lines and thixotropic lines disposed above the ground surface and configured to supply fluids to the system.

30. The system of claim 29, wherein the buoyant capsule raises and lowers as the water is released or added to a top of the cylinder.

31. The system of claim 29, further comprising:
   a pressure resisting roof and standpipe covering the cylinder and being configured to provide water pressure for optimal pump operation.

32. The system of claim 29, wherein a material of the buoyant capsule is selected from the group consisting of: stainless steel, carbon steel, aluminum, polyvinyl chloride (PVC), and High Density Polyethylene (HDPE).

33. The system of claim 29, wherein the buoyant capsule is formed from an arrangement of vertical pipes.

34. The system of claim 33, wherein the vertical pipes are air sealed, water sealed, and pressurized.

35. A system adapted for storing electric energy in a form of gravity energy, the system comprising:
- an excavation disposed beneath a ground surface, the excavation being filled by a fluid;
- a negatively buoyant capsule;
- a pumping system mounted on a top portion of the negatively buoyant capsule;
- a plurality of pumps located above the ground surface and configured to interact with power cabling located above the ground surface to allow for vertical movement of a piston; and
- pipe valves remotely actuated to close off flow when the piston is maintained at a given elevation.

36. The system of claim 35, wherein the buoyant capsule is formed from an arrangement of vertical pipes, and wherein the vertical pipes are air sealed, water sealed, and pressurized.

37. The system of claim 36, wherein a subset of the vertical pipes are located in the buoyant capsule to allow water flow through the buoyant capsule.

38. The system of claim 35, wherein a quantity of the plurality of pumps is four.

39. The system of claim 35, wherein the plurality of pumps are located outside of a silo and are connected to internal pipes.

40. The system of claim 39,
- wherein guides and the internal pipes extend to the ground surface, and
- wherein the plurality of pumps or a turbine are located at the ground surface.

41. The system of claim 39, wherein multiple silos are arranged into a power storage facility with a commonly shared pump/turbine and balance of plant facilities.

42. The system of claim 41, wherein the system further comprises:
- valve options to allow a stepped power storage and generation operation of the facility from low to very high-power operations.

43. The system of claim 39, wherein the system further comprises:
- a gravel bedding layer at a base of the silo that has a capacity to support a gravity weight of the piston or capsule should it be lowered to a lowest possible elevation.

44. The system of claim 43, wherein an arrangement of piping into the gravel bedding layer allows for an application of water pressure under the piston or capsule to allow it to be lifted to store power.

* * * * *